(12) United States Patent
Sakano

(10) Patent No.: US 7,354,195 B2
(45) Date of Patent: Apr. 8, 2008

(54) TEMPERATURE MEASURING DEVICE AND TEMPERATURE MEASURING METHOD

(75) Inventor: Motoya Sakano, Toyama (JP)

(73) Assignees: Kazuhito Sakano, Toyama (JP); Zixsys Inc., Tokyo (JP); FEC Inc., Ishikawa (JP)

( * ) Notice: Subject to any disclaimer, the term of this patent is extended or adjusted under 35 U.S.C. 154(b) by 0 days.

(21) Appl. No.: 10/507,721

(22) PCT Filed: Mar. 20, 2003

(86) PCT No.: PCT/JP03/03437

§ 371 (c)(1),
(2), (4) Date: Sep. 15, 2004

(87) PCT Pub. No.: WO03/078948

PCT Pub. Date: Sep. 25, 2003

(65) Prior Publication Data

US 2005/0141591 A1   Jun. 30, 2005

(30) Foreign Application Priority Data

Mar. 20, 2002   (JP) ............................. 2002-078049

(51) Int. Cl.
*G01K 1/00* (2006.01)
*G01K 7/00* (2006.01)
*G08C 17/02* (2006.01)

(52) U.S. Cl. ................. 374/208; 374/170; 374/183; 340/870.17

(58) Field of Classification Search ............... 374/208, 374/170, 183; 340/870.17
See application file for complete search history.

(56) References Cited

U.S. PATENT DOCUMENTS

| | | | | |
|---|---|---|---|---|
| 3,949,388 A | * | 4/1976 | Fuller | 340/870.17 |
| 4,669,480 A | * | 6/1987 | Hoffman | 600/392 |
| 4,987,579 A | * | 1/1991 | Yoshinaka et al. | 374/208 |
| 5,255,979 A | * | 10/1993 | Ferrari | 374/158 |

(Continued)

FOREIGN PATENT DOCUMENTS

JP   61-296228 A   12/1986

(Continued)

*Primary Examiner*—Gail Verbitsky
*Assistant Examiner*—Mirellys Jagan
(74) *Attorney, Agent, or Firm*—Sughrue Mion, PLLC

(57) ABSTRACT

A temperature measuring device and a temperature measuring method are provided which are capable of obtaining precise measured temperature values with respect even to old persons, sucklings or infants, which device may be formed into a disposable type according to need, which method may be carried out using such a disposable type device according to need, and which enable precise temperature measurement in real time. An on-subject temperature measuring device 1, which is attached to a subject when a temperature of the subject is measured, receives a radio wave from a reader 2 as an external device and is thereby electrically powered. Using the electric power, temperature measurement is performed in the on-subject temperature measuring device 1. The results of the measurement are transmitted through radio waves to the reader 2 in the form of a temperature of the subject and ID data. The reader 2 is so constructed as to be connectable to a personal computer (not shown), and data processing by the personal computer is performed according to need.

25 Claims, 16 Drawing Sheets

U.S. PATENT DOCUMENTS

| | | | |
|---|---|---|---|
| 5,803,915 A * | 9/1998 | Kremenchugsky et al. | 600/549 |
| 5,924,985 A * | 7/1999 | Jones | 600/390 |
| 6,686,843 B2 * | 2/2004 | Felkowitz | 340/573.1 |
| 6,794,990 B2 * | 9/2004 | Tseng | 340/584 |
| 6,847,913 B2 * | 1/2005 | Wigley et al. | 600/549 |
| 2004/0013164 A1 * | 1/2004 | Li | 374/163 |
| 2004/0215098 A1 * | 10/2004 | Barton et al. | 600/549 |
| 2005/0226310 A1 * | 10/2005 | Nakazawa et al. | 374/208 |
| 2005/0245839 A1 * | 11/2005 | Stivoric et al. | 600/549 |
| 2005/0267382 A1 * | 12/2005 | Church et al. | 600/549 |

FOREIGN PATENT DOCUMENTS

| | | |
|---|---|---|
| JP | 62145127 A * | 6/1987 |
| JP | 9-89676 A | 4/1997 |
| JP | 2713274 B2 | 2/1998 |

* cited by examiner bottom view B bottom view C

TEMPERATURE MEASURING DEVICE AND TEMPERATURE MEASURING METHOD

TECHNICAL FIELD

The present invention relates to a temperature measuring device which is preliminarily attached to a surface of a subject of temperature measurement to carry out temperature measurement. In particular, it relates to a temperature measuring device and a temperature detecting method which, if a subject of temperature measurement is for example a human body, are capable of instantaneously and precisely measuring a temperature from the outside of clothing on the human body.

BACKGROUND ART

In relation to a shape of a temperature detecting part of an electronic thermometer, for example, there has been proposed in Japanese Unexamined Patent Publication No. 133030/1988 an electronic thermometer which is attachable to a body surface and has a discoidal shape. However, a temperature detecting part which has been practically used generally has a rod-like shape, and measurement of body temperatures has been conducted by holding or inserting such a temperature detecting part having a rod-like shape under or in a specific site such as an armpit, a rectum, a mouth or the like.

As temperature measuring modes in such electronic thermometers, there have been employed an estimation mode in which a rate of body temperature increase is detected in a predetermined period of time from just after initiation of temperature detection, and a settled temperature is calculated based on the rate of change to indicate the calculated temperature as a body temperature; and an actual measurement mode in which measurement is performed until detected temperatures substantially settle.

A temperature indication mode in an electronic thermometer is such a mode that indication of the maximum value of temperatures of a body is kept, as in the case of a mercury or alcohol thermometer. Accordingly, it is necessary to once reset temperature indication when a subsequent temperature detection is conducted.

In an electronic thermometer, a temperature detecting part is generally made of a metallic material capable of facilitating thermal conduction or a flexible material such as a silicone or the like and formed into a rod-like shape. However, if such a rod-like shaped temperature detecting part is put under an armpit, there are difficulties as follows. In the case of a thin figured parson, it is difficult to stably hold the rod-like shaped temperature detecting part because a gap is likely to be formed under the person's armpit from the first. Particularly in a case of an old person, it is difficult to precisely detect a body temperature because the person's muscle has become weak and flabby and an enlarged gap is consequently tends to be formed under the person's armpit.

In the case of a suckling or an infant, it is not easy to stably and continuously hold the rod-like shaped temperature detecting part over a temperature detecting period of a several minutes, and it is accordingly difficult to precisely detect a body temperature.

In the case of oral thermometry, to prevent a sublingual temperature from being changed by exhalation, it is necessary that a mouth be closed over a period of a several minutes. It is, however, too stringent to impose such a restrained condition on a suckling or an infant. Accordingly, it is difficult to precisely measure a body temperature.

In the case of rectal thermometry, hygienic management such as sterilization of a thermometer is cumbersome. Accordingly, rectal thermometry is not suitable for body temperature measurement in a general household.

On the other hand, temperature measuring mode in an electronic thermometer includes an estimation mode and an actual measurement mode as described above. In the estimation mode, it is necessary to establish a uniform measuring condition by stabilizing a pressing force exerted on an electronic thermometer held under an armpit. In other words, if a gap under the armpit or the pressing force exerted on the electronic thermometer held under the armpit is changed within a period for the estimation, the condition of heat transfer from a body surface to the electronic thermometer is changed to cause a change in rate of measured temperature increase in the course of the measurement. Accordingly, it is difficult to effect precise calculation for the estimation.

In the case of the actual measurement mode, each of temperature measurement, in which an electronic thermometer is held under an armpit under stable pressing force without forming a gap under the armpit over a period of 5 minutes or longer, and temperature measurement, which requires that an electronic thermometer is sublingually and stably held in a mouth while continuing nasal breathing, has been a hurdle to obtaining precise measurements.

Generally, an electronic thermometer indicates a measured temperature in peak hold mode as its temperature indication. It is, however, necessary to once reset the temperature indication after completion of temperature measurement. Accordingly, such an electronic thermometer is not suitable for monitoring a succession of subject body temperatures in real time.

Further, in a general type electronic thermometer, a measured temperature value is shown on a display of the thermometer. This imposes the trouble of reading and recording a temperature indication every time a measured temperature is indicated on a user (a nurse mainly in a clinic or hospital).

With a view to solving the above-described problems, there has bee disclosed in Japanese Unexamined Patent Publication No. 133030/1988 an electronic thermometer which comprises a flexible substrate, a battery as an electric power source and a circuit element which are mounted on the flexible substrate, and a flexible and heat-insulating covering which covers other parts than a temperature detecting part.

In Japanese Unexamined Patent Publication No. 133030/1988, it has been proposed as a means for saving the trouble of recording indicated temperatures to store temperature data, which is transmitted from an electronic thermometer applied to a surface of a body, in a memory of an external device. In Japanese Unexamined Patent Publication No. 133030/1988, however, a wire communication mode is employed in which the thermometer attached to a body surface and the external device are connected by a cable, leading to poor manageability.

Further, in the electronic thermometer of Japanese Unexamined Patent Publication No. 133033/1988, presence of a battery as an electric power source is always required in order to drive the circuit element, and every time battery power is exhausted, it is consequently required to replace an exhausted battery with another. Moreover, there is a problem that when a battery is replaced, a stress is likely to be exerted on soldered part in the circuit element because of the flexibility of the substrate to cause a failure.

Furthermore, when a battery is replaced, the covering having flexibility and heat insulating properties is peeled. This poses a problem in repeated use.

Still further, as means for outputting in the electronic thermometer of Japanese Unexamined Patent Publication No. 133030/1988, there is employed such a mode that a cable is externally connected to a fixed connector provided on the flexible substrate. However, when the external cable is connected to the fixed connector provided on the flexible substrate attached to a body surface, a strong stress is likely to be exerted on the circuit element mounted on the flexible substrate to cause a failure. Further, it is easily supposable that if the external cable is connected to and disconnected from the connector as often as a temperature is measured, it is easily supposable that possibility of a failure increases. On the other hand, in a case where the cable is left connected, if the cable is pulled, an excessive stress can be exerted depending upon the condition of the pulling on the connector of the electronic thermometer and a connector of the cable to cause a failure of the fitting therebetween. Accordingly, it is pointed out that this constitutes a major factor of a contact failure or the like.

A subject with the electronic thermometer of Japanese Unexamined Patent Publication No. 133030/1988 attached on a body surface thereof has such an inconvenience that the subject's own freedom of movement is restricted when the electronic thermometer is connected to an external appliance by a cable. Further, the external appliance and the electronic thermometer are put in a one-to-one relationship to thereby lead to poor working efficiency of the external appliance. On the other hand, if a plurality of input ports are provided with an external appliance and a plurality of electronic thermometers are connected thereto in parallel, cost of the external appliance per se is increased, and besides this, each of subjects has an inconvenience of being put under a further restrained condition in order to prevent a plurality of cables from being entangled.

The electronic thermometer of Japanese Unexamined Patent Publication No. 133030/1988 interiorly comprises an electric circuit, a temperature detecting part and a temperature measuring means, and further comprises a battery as an electric power source and a fixing hardware for the battery, an output connector, a covering having heat insulating properties and the like to form an integrated structure. The structure as a whole has many parts, and from the viewpoint of being a device which is applied to a body surface in use, it has a problem of incompatibility between thickness and flexibility Further, the largeness in number of the parts leads to cost increase. In view of this, the structure has a hurdle in terms of as a disposable type.

Alternatively, if it is intended to output data from the temperature measuring device to an external device by means of optical communication and to receive the data by a phototransistor, absence of a light-intercepting object between the temperature measuring device as a light-emitting side and the external device as a light-receiving side is required. Accordingly, during temperature measurement with the temperature measuring device applied to a body surface of a subject, the subject is not permitted to cover the temperature measuring device with clothing or the like. It follows that the body surface and the temperature measuring device are exposed to ambient air. In consequence, there is a critical problem that a temperature of the body surface is influenced by a temperature of the ambient air to hinder precise measurement of the body temperature of the subject.

If it is intended to measure a body temperature in real time with the electronic thermometer of Japanese Unexamined Patent Publication No. 133030/1988, it is required to align optical axes of the electronic thermometer as a light-emitting side and a light-receiving side by inserting an optical fiber for light reception into clothing and leading to a vicinity of a connector for light-outputting of the body temperature measuring device with a body surface and the body temperature measuring device covered with the clothing. For this purpose, a member for fixing the optical fiber for light reception to the body temperature measuring device in some manner is required to result in a complicated structure and cost increase. In this regard, even if the body temperature measuring device and the light-receiving side as a data-receiving side are not electrically connected, this fiber-optic communication mode is not substantially different from a wire communication mode so long as the optical fiber is present. In such a fiber-optic communication mode, relationship between the body temperature measuring device and the data-receiving device is one-to-one during measurement, that is to say, the data-receiving device is used by only a single subject. This gives rise to a problem of poor efficiency.

Further, the electronic thermometer of Japanese Unexamined Patent Publication No. 133030/1988 employs, as a means for detecting a temperature of a subject, a means in which a thermistor is brought into direct contact with a body surface. However, if it is intended to perform temperature detection with a thermistor chip as a temperature data detecting means in direct contact with a skin as a body surface, stable contact with the surface of the flexible skin is not always obtainable. Accordingly, it is impossible to effect precise measurement of a temperature of a subject.

The present invention has been made in view of the above-described problems inherent in the conventional techniques. It is, therefore, an object of the present invention to provide a temperature measuring device and a temperature measuring method which are capable of obtaining precise measured temperature values with respect even to old persons, sucklings or infants, which are capable of relieving troubles of monitoring and recording temperatures of subjects, which are simply operable and less susceptible to troubles to permit stable operation, which device comprises a small number of parts and may be formed into a disposable type according to need, which method is carried out by means of such a device, and which enable precise temperature measurement in real time.

DISCLOSURE OF INVENTION

The temperature measuring device disclosed in the present application characteristically comprises a flexible sheet which has its at least one surface endowed with stickiness and which is provided with an opening and/or at least one hole, and a temperature data detecting means for detecting a temperature of the inside of the opening and/or at least one hole.

A detecting part of the temperature data detecting means is preferably so disposed as to be exposed to the inside of the opening and/or at least one hole. At least one side of the opening and/or at least one hole is formed by the temperature measuring means, and a sealed air layer is formed inside the opening and/or at least one hole by a subject and the temperature data detecting means.

The temperature data detecting means preferably employs a means for converting a temperature value into a frequency, and the temperature data detecting means is preferably accommodated in a space defined by a predetermined thickness of the flexible sheet.

The temperature data detecting means preferably employs a means for converting a temperature value into a period, and the temperature data detecting means is preferably accommodated in a space defined by a predetermined thickness of the flexible sheet.

The temperature data detecting means is preferably provided with a built-in A/D converter for A-to-D converting a resistance value or voltage value in the form of an analog physical value, into which a temperature value has been converted, into a digital physical value.

A plurality of the openings and/or holes are provided. The temperature measuring device may comprise an electromagnetic wave transmitting and receiving means which cooperates with the temperature data detecting means. The electromagnetic wave transmitting and receiving means may have an inductively coupled means for receiving electromagnetic waves from an external device. The inductively coupled means receives an electromotive force from the external device through radio waves to supply electric power to the temperature data detecting means. From the temperature data detecting means, temperature data is radio-transmitted via an antenna coil of the inductively coupled means to the external device. The temperature data and an ID code are combined into a unit and radio-transmitted from the temperature data detecting means via the antenna coil to the external device.

A film-form control substrate with a system LSI chip mounted thereon is preferably attached to an upper surface of the flexible sheet, and the temperature data detecting means is preferably attached to an underside surface of the film-form control substrate in such a manner that the temperature data detecting means is exposed to an air layer in the opening formed in the flexible sheet. An adhesive-applied sheet is attached to the flexible sheet to which the film-form control substrate is attached, and a space in the opening is thereby sealed. An air hole is formed at a predetermined position in the adhesive-applied sheet. Punched holes are formed in the adhesive-applied sheet. The adhesive-applied sheet is attached to the flexible sheet to which the film-form control substrate is attached, and a space in the opening is thereby sealed, and a open-pore polytetrafluoroethylene is preferably used for the adhesive-applied sheet and/or the film-form control substrate and/or the flexible sheet to which the film-form control substrate is applied. The temperature data detected by the temperature data detecting means is temperature data on a human body.

The temperature measuring method of the present invention comprises providing a flexible sheet with an opening and/or at least one hole, attaching the flexible sheet to a subject to thereby form an air layer sealed by the opening and/or at least one hole, and measuring a temperature of the air layer by means of a temperature data detecting means. Temperature data detected by the temperature data detecting means is stored in a memory provided on the flexible sheet, and the temperature data stored in the memory is read out after removal of the flexible sheet from the subject. The subject may be a human body.

In the present invention, a human body is a major and significant subject. Accordingly, the temperature measuring device and the temperature measuring method of the present invention are extremely suitably and conveniently used as a temperature measuring device and a temperature measuring method for a human body, i.e., a so-called clinical thermometer and a so-called clinical thermometric method. In view of this, the present invention will be described in detail hereinbelow centering the present invention on a case where the temperature measuring device or the temperature measuring method of the present invention is applied to a human body. It is, however, to be noted that a subject to which the temperature measuring device or the temperature measuring method of the present invention is applied is by no means restricted to a human body and that the subject includes all of those with respect to which the object of the present invention is significantly achieved.

In the present invention, the temperature measuring device comprises a flexible sheet having its at least one surface endowed with stickiness and provided with an opening and/or at least one hole, and a temperature data detecting means for detecting a temperature of the inside of the opening and/or at least one hole; and the temperature measuring device is such an on-subject surface temperature measuring device that it is attached to a desired site of a subject and has a function of radio-transmitting temperature data on the subject detected by the subject temperature detecting means.

An external device supplies electric power through electromagnetic waves to the on-subject surface temperature measuring device, and receives the temperature data on the subject from the on-subject surface temperature measuring device through radio waves, and subjects the temperature data to calculation with a CPU in the external device and with a function formula written in a program to convert the temperature data into a temperature value of the subject, and indicates the temperature value. In other words, the on-subject surface temperature measuring device and the external device are non-contact type energy and data transmitting-receiving devices which are radio-coupled by means of a natural resonance frequency The on-subject surface temperature measuring device is designed to be compact, lightweight and thin, and the on-subject surface temperature measuring device per se is designed to have no electric source such as a battery but has a function of receiving electric power supply from the external device through radio waves. That is to say, when the on-subject surface temperature measuring device is brought into an area which permits radio-communication with the external device, electric power can be radio-transmitted from the external device to activate the function of the on-subject surface temperature measuring device.

When the on-subject surface temperature measuring device is actually in electromagnetic communication with the external device, electric energy is electromagnetically supplied thereto. Accordingly, the on-subject surface temperature measuring device is able to have a batteryless structure and can be formed into a compact, lightweight and thin sheet- or label-like structure. Further, the on-subject surface temperature measuring device is free from battery replacement and thus can be used semipermanently as a thermometer. Since the on-subject surface temperature measuring device simply comprises a printed antenna coil and one chip or several chips as electronic parts, production cost can greatly be reduced. This enables the on-subject surface temperature measuring device to be used as a disposable one.

As a feature of the present invention, a flexible sheet having a predetermined thickness is provided with an opening, and to an upper surface of the flexible sheet, a film-form and/or label-form substrate provided with a control element and/or a CPU and/or an antenna coil and a temperature detecting means is so attached as to cover a space defined by the opening. Further, an adhesive material is applied to an underside surface of the flexible sheet having a predetermined thickness for applying a temperature measuring device to a body surface or subject. With the temperature measuring device applied to the body surface or subject, the space in the opening is sealed. A temperature of an air layer in the sealed space is detected by the temperature data detecting means as a faithful and stable reflection of a temperature of the body surface or subject.

The above-described indirect mode of temperature detection with the interposition of the air layer is effective for solving the problems inherent in the conventional temperature measuring devices, particularly clinical thermometers. This is because it is possible by the indirect mode to eliminate inaccuracy-causing factors in measurement of temperatures, which would cause variations in results if temperature data detecting means were directly applied to body surfaces by the medium of the adhesive material, due to irregularities dependent upon products in application thicknesses of the adhesive material, or changes in quantities of heat conducted from subject body surfaces attributable to changes in adhesion or the like in the course of uses after applications to the body surfaces, thereby enabling stable and precise temperature measurement.

Further, if a mode in which a temperature data detecting device is brought into direct contact with a skin and attached to the body surface by means of medical tape or the like is employed, there is still a problem that precise measurement of temperatures of subjects cannot be effected because stable contacts with flexible skin surfaces cannot be constantly be obtained with respect to an electronic thermometer of Japanese Unexamined Patent Publication No. 133030 or an electronic thermometer having a rod-like shaped temperature detecting part.

Therefore, the above-described indirect mode of temperature detection with the interposition of the air layer is a temperature measuring mode which is capable of solving the above-described problem of the destabililzing factors, i.e., inaccuracy-causing factors.

BEST MODE FOR CARRYING OUT THE INVENTION

FIRST EMBODIMENT

Figure 1:
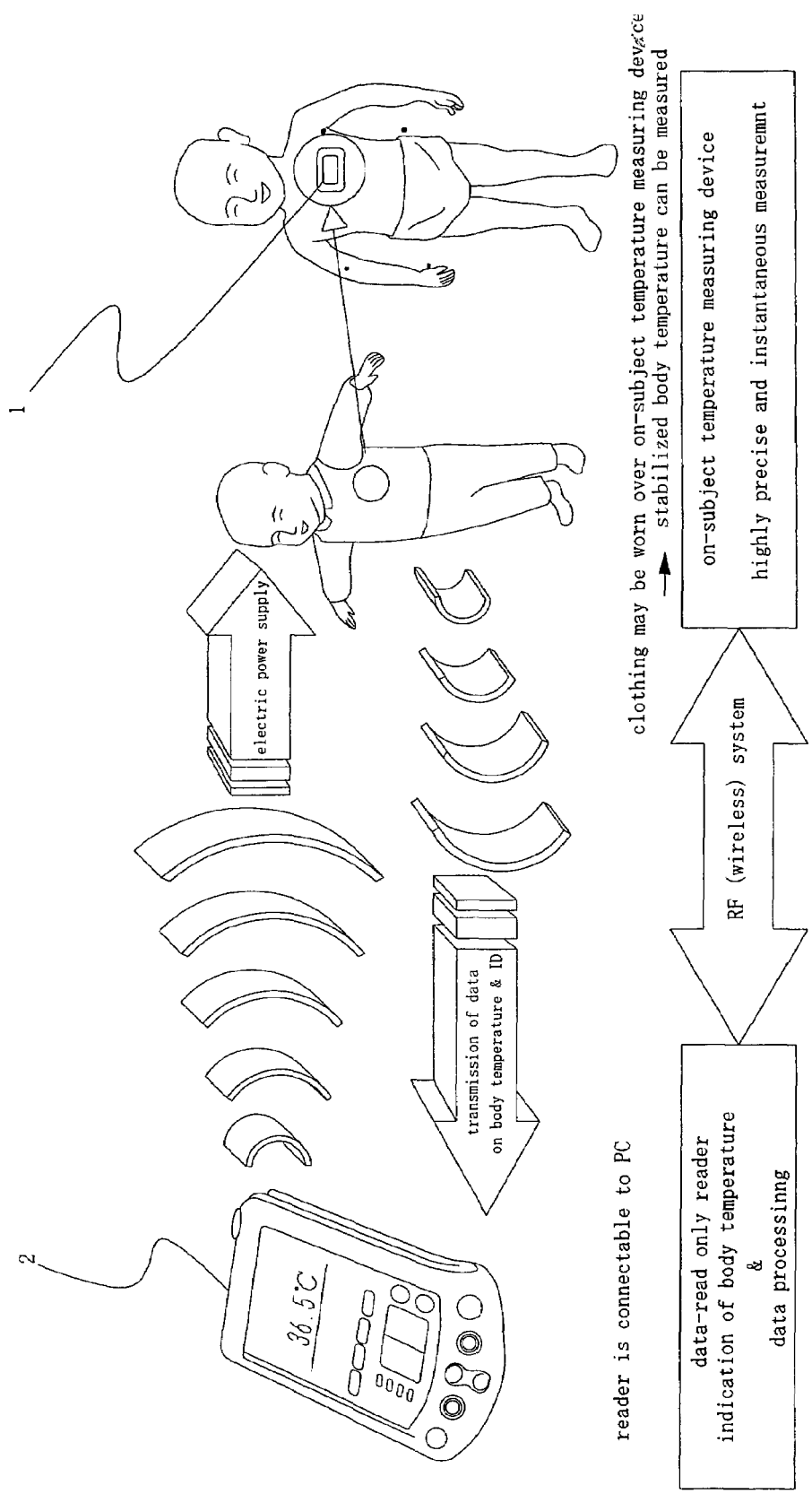
FIG. 1 is an overall schematic view of a temperature measuring system to which a first embodiment of the temperature measuring device according to the present invention is applied.

FIG. 1 is an overall schematic view of a temperature measuring system to which a first embodiment of the temperature measuring device according to the present invention is applied.

Referring to FIG. 1, an on-subject temperature measuring device 1 as a temperature measuring device, which is attached to a subject when a temperature of the subject is measured, receives a radio wave from a reader 2 as an external device and is thereby electrically powered. By means of the electric power, temperature measurement is performed in the on-subject temperature measuring device 1. The results of the measurement are transmitted through radio waves to the reader 2 as a temperature of the subject and ID data. The reader 2 is so constructed as to be connectable to a personal computer (not shown), and data processing by the personal computer is performed according to need.

Figure 2:
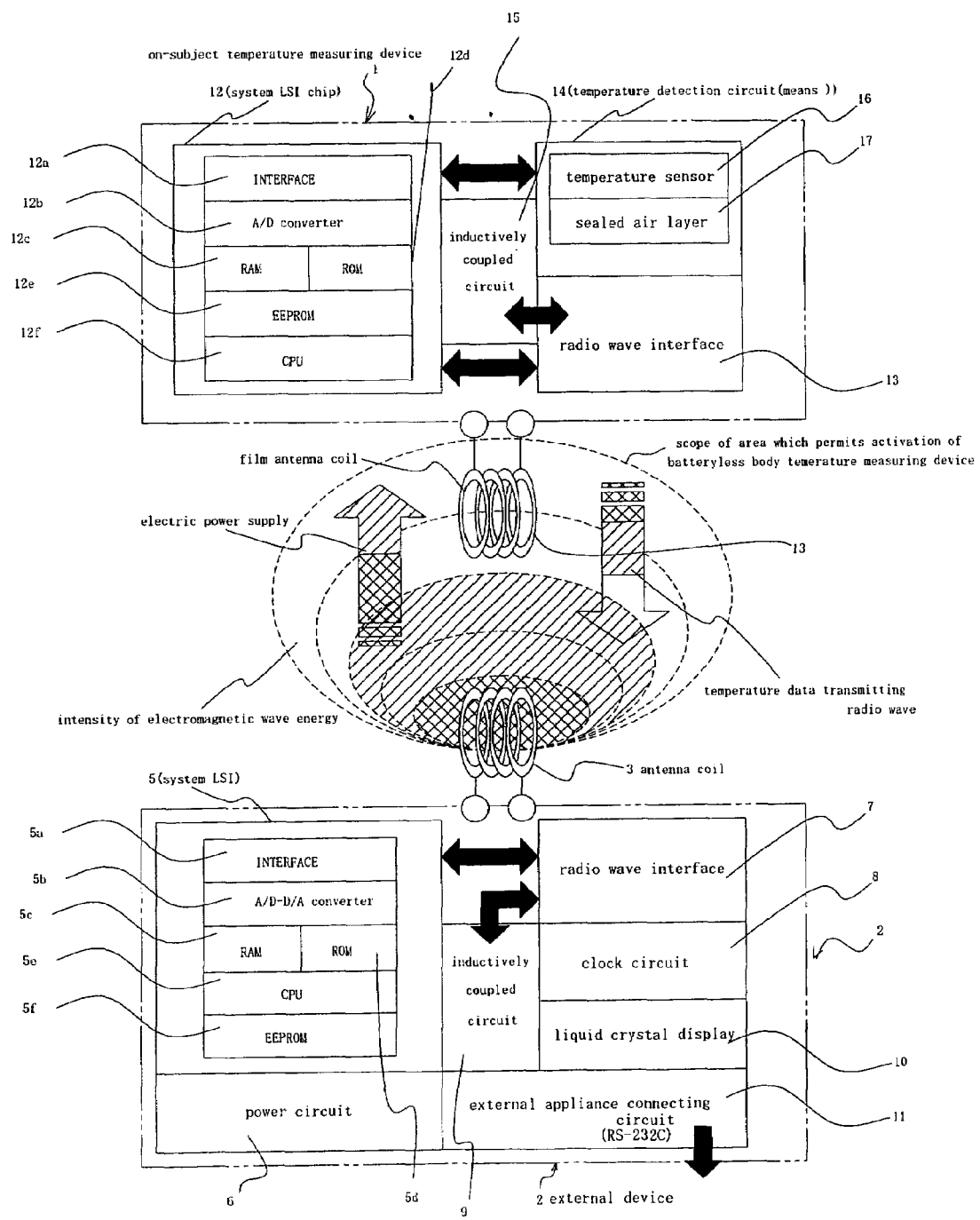
FIG. 2 is an overall schematic view schematically representing the temperature measuring system, to which the first embodiment shown in FIG. 1 of the temperature measuring device is applied, into functional blocks.

FIG. 2 is an overall schematic view schematically representing the temperature measuring system, to which the first embodiment shown in FIG. 1 of the temperature measuring device is applied, into functional blocks. As shown in FIG. 2, the reader 2 comprises a reader body provided with an antenna coil 3, and radio waves are sent and received through the antenna coil 3 between the reader 2 and the on-subject temperature measuring device 1 provided with a film antenna coil 4.

As shown in the FIG., an electromotive force is supplied by means of a radio wave from the reader 2 through the antenna coil 3 to the on-subject temperature measuring device 1. On the other hand, from the on-subject temperature measuring device 1, the temperature data is transmitted by means of a radio wave to the reader 2.

As shown in the FIG., the reader 2 is equipped with a system LSI 5 and has a power circuit 6 for supplying driving electric power, a radio wave interface 7 for inputting radio signals from and outputting radio signals to the antenna coil 3, a clock circuit 8 for generating a reference clock signal, an inductively coupled circuit 9 for inputting electromagnetic signals from and outputting electromagnetic signals to the radio wave interface 7, a liquid crystal display 10 for displaying temperature measurement results and the like, and an external appliance connecting circuit 11 for connecting the reader 2 to an external appliance (not shown).

The system LSI comprises an interface 5a, an A/D-D/A converter 5b, a RAM 5c, a ROM 5d, a CPU 5e and an EEPROM 5f. The reader 2 is constructed to be of such a handy type that the above-mentioned antenna coil 3 receives an ID code of the on-subject temperature measuring device 1, temperature data and a thermistor characteristics ID, and the received data is processed and the processed data is stored in the system LSI 5, and the processed data is shown on the liquid crystal display 10. The reader 2 by itself can sequentially scan radio waves from a plurality of on-subject temperature measuring devices 1 to read in the radio waves, and the data is stored in the RAM 5c as internal memory of the reader 2 in the form of data units each of which is composed of an ID code of an on-subject temperature measuring device 1, temperature data and a thermistor characteristics ID, and then the data is calibrated and IDs of the on-subject temperature measuring devices 1 and values of measured temperatures are shown on the display 10. Alternatively, the reader 2 may be connected to an external appliance (not shown) such as a personal computer, and the data once stored in the reader 2 is en bloc transmitted to the personal computer to process the temperature data and the ID codes of the on-subject temperature measuring devices 1.

Since the reader 2 performs high speed scanning of the temperature data while recognizing the ID codes of the on-subject temperature measuring devices 1 when the reader receives the data, the reader 2 is capable of reading in the data on the plurality of the on-subject temperature measuring devices 1 almost instantaneously.

On the other hand, as shown in the FIG., the on-subject temperature measuring device 1 is equipped with a system LSI chip 12 and comprises a radio wave interface 13 for inputting signals from and outputting signals to a film antenna coil 4, a temperature detecting part 14, and an inductively coupled circuit 15 for inputting signals from and outputting signals to the radio wave interface 13. The LSI chip 12, which inputs signals from and outputs signals to the temperature sensing section 14 and the radio wave interface 13, comprises an interface 12a, an A/D converter 12b for detecting a temperature-dependent resistance of the temperature detecting part 14 and converting the detected temperature-dependent resistance into written data, a RAM 12c, a ROM 12d, a CPU 12e and an EEPROM 12f.

The above-mentioned temperature detecting part 14 comprises a temperature data detecting means 16 and a sealed air layer 17.

Figure 3:
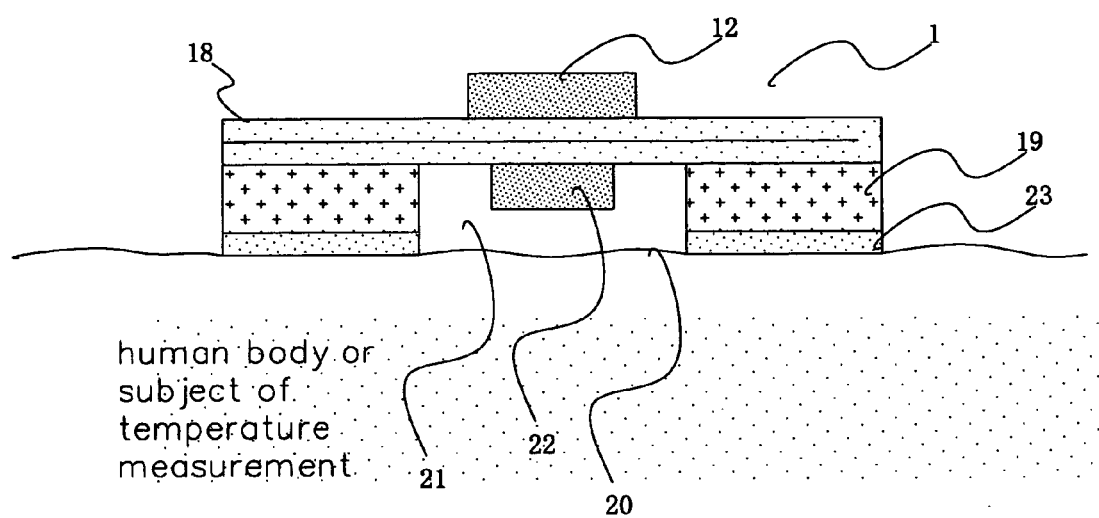
FIG. 3 is a sectional side view of the on-subject temperature measuring device.

FIG. 3 is a sectional side view of the above-mentioned on-subject temperature measuring device 1. Referring to FIG. 3, the system LSI chip 12 is mounted on an upper surface of a film-form control substrate 18, and the film-form control substrate 18 is attached to an upper surface of a nonwoven fabric 19 having a predetermined thickness as a flexible seat, and a chip thermistor 22 is attached to the reverse surface of the above-mentioned film-form control substrate 18 in such a manner that the chip thermistor is exposed to an air layer 21 in an opening 20 formed in the nonwoven fabric 19 having a predetermined thickness. To the reverse surface of the nonwoven fabric 19 having a predetermined thickness, an adhesive material 23 for attaching the on-surface temperature measuring device 1 to a surface of a subject body is applied.

The nonwoven fabric 19 having a predetermined thickness attached to the surface of the subject body provides a space defined by the opening 20 centrally formed in the nonwoven fabric 19 to thereby provide the air layer 21 having a thickness approximately corresponding to the predetermined thickness of the nonwoven fabric between the surface of the subject body and the reverse surface of the film-form control substrate 18.

As described above, the reverse surface of the nonwoven fabric 19 is such that the adhesive material 23 is applied to the portion thereof which is other than and surrounds the opening 20. Accordingly, when the on-subject temperature measuring device 1 is attached to the surface of the subject body, the air layer 21 is confined in the space defined by the opening 20 and sealed from ambient air. A temperature of the air layer 21 isolated from ambient air is not substantially influenced by a temperature of ambient air and is thus capable of straight reflecting a temperature of the surface of the subject body. The chip thermistor 22 is so disposed as to be directly exposed to the air layer 21.

The indirect mode of the temperature detection with the interposition of the air layer 21 is able to eliminate destabilizing factors in measurement of temperatures of subjects, which would cause variations in results if temperature data detecting means were directly applied to surfaces of the subject bodies by the medium of the adhesive material 23, due to irregularities dependent upon products in thicknesses of the applied adhesive material 23, or due to changes in quantities of heat conducted from subject body surfaces attributable to changes in adhesion or the like in the course of uses after applications to the subject body surfaces, or due to other causes. Further, a mode in which a temperature data detecting device is brought into direct contact with a skin by means of medical tape or the like is not capable of precisely measuring temperatures of subjects because stable contacts with flexible skin surfaces cannot constantly be obtained, whereas the above-described mode which indirectly measures temperatures via the sealed air layer 21 is capable of measuring temperatures precisely and stably.

As the temperature data detecting means located in the space defined by the opening 20 of the nonwoven fabric 19 having a predetermined thickness as described above, there may be used a means to convert a temperature value into a resistance value. Besides the above-mentioned chip thermistor 22, such a means to convert a temperature value into a resistance value may be a thermistor pattern printed on the film-form control substrate 18 or a platinum resistance temperature sensor. In this case, a thinner resistance temperature sensor chip should be attached to the reverse surface of the film-form control substrate to form a such a structure that the temperature sensor chip is prevented from being brought into direct contact with the surface of the subject body such as a skin.

As the temperature data detecting means located in the space defined by the opening 20 of the nonwoven fabric 19 having a predetermined thickness, there may also be employed a means to convert a temperature value into a voltage value. As the means to convert a temperature value into a voltage value, a thermoelectric couple utilizing Seebeck effect, a PN device or PN diode utilizing Peltier effect, or an IC chip exhibiting a voltage output proportional to a temperature may be placed in the space defined by the opening 20 of the nonwoven fabric 19 having a predetermined thickness.

As the temperature data detecting means located in the space defined by the opening 20 of the nonwoven fabric 19 having a predetermined thickness, there may further be employed a means to convert a temperature value into a frequency. As the means to convert a temperature value into a frequency, there may be placed in the space defined by the opening 20 of the nonwoven fabric 19 having a predetermined thickness, a chip IC for further converting the physical value into which the temperature value has been converted, i.e., the above-mentioned resistance value or voltage value into a frequency by means of a multivibrator circuit, an oscillating circuit or a V-F converter to thereby transmit the frequency signal directly to the reader 2 as an external device without intermediary of an A/D converter.

As the temperature data detecting means located in the space defined by the opening 20 of the nonwoven fabric 19 having a predetermined thickness, there may further be employed a means to convert a temperature value into a period of time. As the means to convert a temperature value into a time period, there may be placed in the space defined by the opening 20 of the nonwoven fabric 19 having a predetermined thickness, a chip IC for further converting the above-mentioned signal resulting from the conversion into a time period or a pulse duration.

Moreover, as the temperature data detecting means, a LSI chip with a built-in A/D converter for A-to-D converting the analog physical value into which the temperature value has been converted, i.e., the above-mentioned resistance value or voltage value into a digital signal may be placed in the space defined by the opening 20 of the nonwoven fabric 19 having a predetermined thickness.

As described above, the film-form control substrate 18 is equipped with the system LSI chip 12 including a CPU chip and a memory IC or including a CPU and a memory IC.

In the memory IC, there is stored data for calibrating a difference among individuals in conversion characteristics which develops when a temperature value of a subject is converted into any of a resistance value, voltage value, frequency, time period, duration or the like.

The film-form control substrate 18 is provided with the inductively coupled circuit 15 which generates electric power by the exposure to radio wave energy from the reader 2. The inductively coupled circuit 15 is provided with the film antenna coil 4 for receiving the radio wave energy from the reader 2 as an external device.

The film-form control substrate 18 is provided with the chip thermistor 22 or a film-type thermistor (R th) which is formed by patterning coplanarly with the inductively coupled circuit 15 having the film antenna coil 4. In this way, by the exposure to the radio wave energy from the reader 2 as an external device via the film antenna coil 4, the electromagnetic induction coupled circuit 15 induces an induced voltage to generate electric power. Accordingly, the thermometer on-subject temperature measuring device 1 of the present invention per se is not required to be provided with an electric source and so constructed as to have no battery.

In the first embodiment, an NTC thermistor is used as the temperature data detecting means. Preliminarily in preparation stage of each of on-subject temperature measuring devices 1, pieces of temperature-to-resistance conversion data on an NTC thermistor with respect to different temperatures in a referential range between 32° and 42° are sequentially stored in a virgin memory in a thermostatic chamber preliminarily at a stage of production of each on-subject temperature measuring device 1, the stored data is used as an intrinsic thermistor characteristics ID of each on-subject temperature measuring devices 1.

In the first embodiment, with a view to reducing a capacity of each memory with which each of the on-subject temperature measuring devices 1 is equipped, the memory is provided with no function formula for performing the calibration at the on-subject temperature measuring device's end. However, if the capacity of the memory allows storage of the function formula and results of calibration, an individual difference in temperature-to-resistance conversion characteristics of each chip thermistor 22 may be calibrated to store the results in the EEPROM 12*f*.

On the other hand, the reader 2 is provided with representative values of the data on the temperature-to-resistance conversion characteristics of the thermistors. This representative value data serves as referential data with respect to thermistor conversion data on all the on-subject temperature measuring devices 1. Further, based on the referential data, a fundamental function formula is preliminarily written as a mask ROM in a memory of each reader 2 as an external device in the course of preparation of each reader 2.

In practical temperature measurement of a subject, the measured temperature data and the thermistor characteristics ID are transmitted in the form of combined data or separately in a time-divisional manner from the on-subject temperature measuring device 1 to the reader 2 as an external device. The reader 2 stores the measured temperature data and the thermistor characteristics ID, which have been received through the radio waves, once in the RAM 5*c*.

The thermistor characteristics ID is assigned to the fundamental function formula which has preliminarily been stored in the reader 2 to create a new temperature conversion function formula. Further, the measured temperature data is assigned to the thus created temperature conversion function formula to thereby determine the temperature?.

In the first embodiment of the thermometer on-subject temperature measuring device 1, the film antenna coil 4, the film type thermistor and the CPU are provided substantially coplanarly on of one film-form control substrate 18. However, it is not necessary that these members be provided substantially coplanarly. According to another form, it is possible to employ such a structure that the film antenna coil 4, the film type thermistor and the CPU chip or film type CPU are disposed in a laminated multilayer manner.

For construction of the on-subject temperature measuring device 1 used in the temperature measuring system to which the first embodiment of the temperature measuring device is applied, there will be described below a process for providing the film antenna coil 4, the chip thermistor 22 (film type thermistor) and the system LSI chip 12 substantially coplanarly on one film-form control substrate 18.

Figure 4:
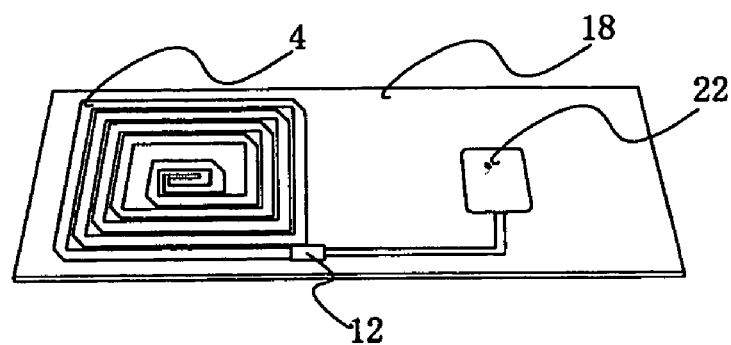
FIG. 4 is a representation illustrating a process of planarly forming the on-subject temperature measuring device in the temperature measuring system to which the first embodiment of the temperature measuring device is applied.
Figure 5:
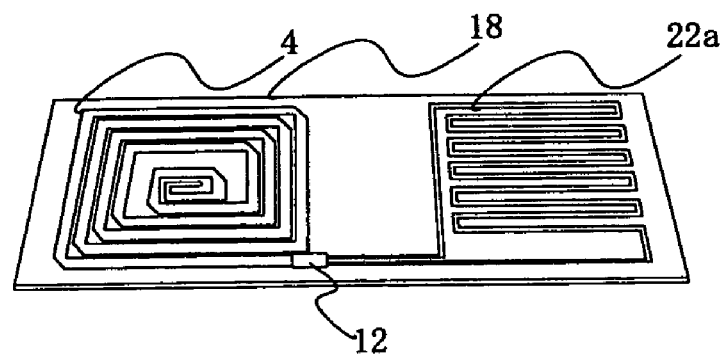
FIG. 5 is a representation illustrating a process of coplanarly forming the on-subject temperature measuring device in the temperature measuring system to which the first embodiment of the temperature measuring device is applied.

As shown in FIG. 4, first, on a left area of a surface of the film-form flexible control substrate 18, the inductively coupled circuit 15 including the film coil antenna 4 and the system LSI chip 12 are disposed, and on a right area of the same surface of the film-form flexible control substrate 18, the chip thermistor 22 is mounted. Instead of the chip thermistor 22, a thermistor pattern 22a may be printed as shown in FIG. 5.

Figure 6:
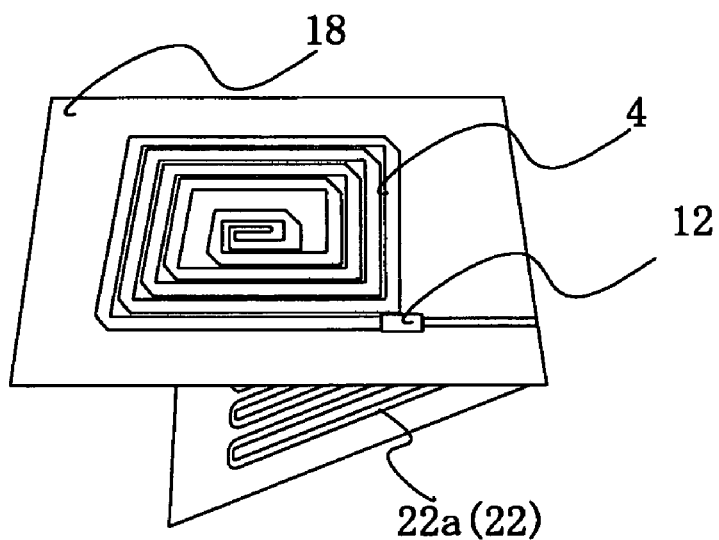
FIG. 6 is a representation illustrating a process of coplanarly forming the on-subject temperature measuring device in the temperature measuring system to which the first embodiment of the temperature measuring device is applied.

Then, as shown in FIG. 6, the film-form flexible control substrate 18 is so bent as to dispose the chip thermistor 22 or thermistor pattern 22a on the reverse surface relative to the upper surface of the film-form flexible control substrate 18 on which the system LSI chip 12 is disposed. In this manner, by constructing such a single-sided substrate that wiring pattern is printed on the same surface of the film-form flexible control substrate 18 on which the other parts are provided to thereby provide all the electronic parts on the same surface of the film-form flexible control substrate 18, it is possible to economically prepare the substrate. This leads to economical preparation of the on-subject temperature measuring device.

Figure 7:
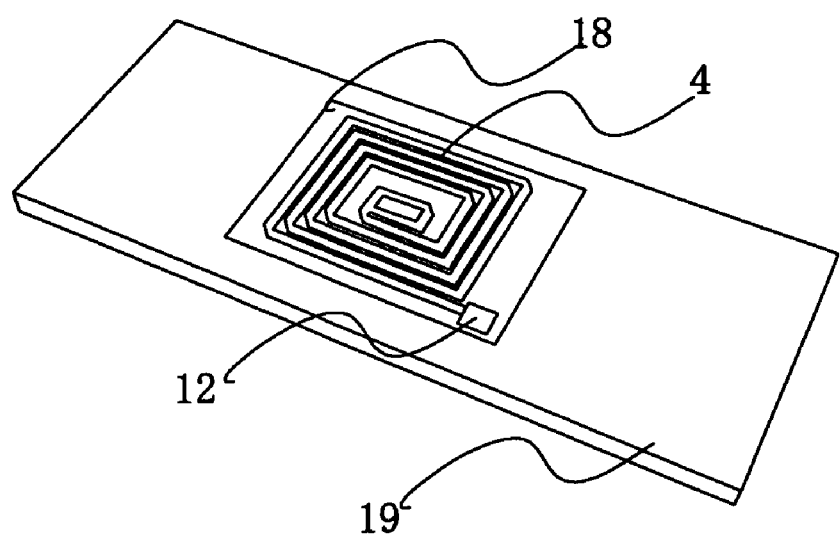
FIG. 7 is a representation illustrating a process of coplanarly forming the on-subject temperature measuring device in the temperature measuring system to which the first embodiment of the temperature measuring device is applied.
Figure 8:
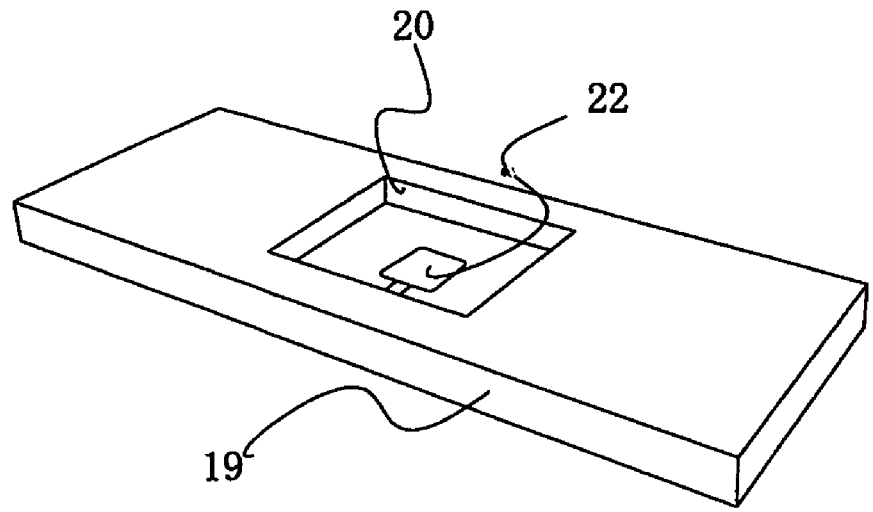
FIG. 8 is a representation illustrating a process of coplanarly forming the on-subject temperature measuring device in the temperature measuring system to which the first embodiment of the temperature measuring device is applied.
Figure 9:
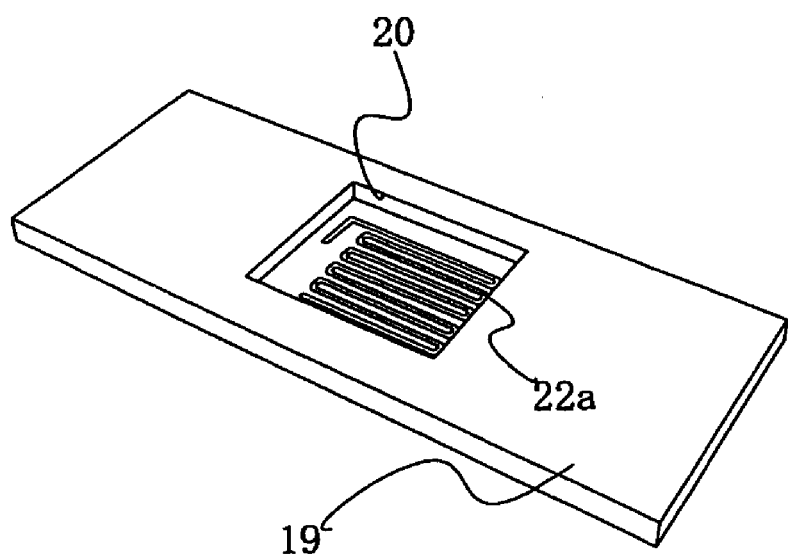
FIG. 9 is a representation illustrating a process of coplanarly forming the on-subject temperature measuring device in the temperature measuring system to which the first embodiment of the temperature measuring device is applied.
Figure 10:
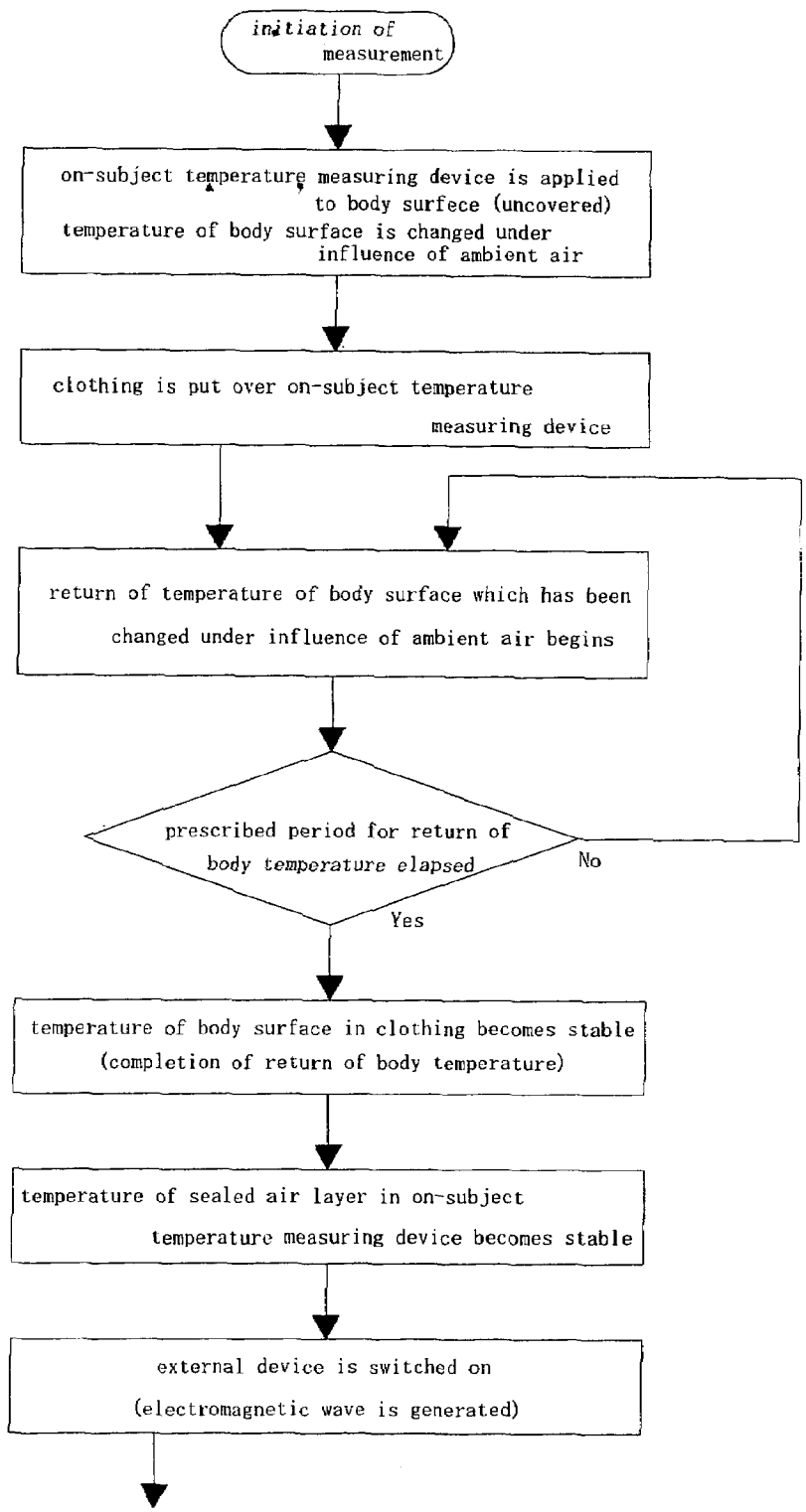
FIG. 10 is a flow chart of a temperature measuring process in the temperature measuring system to which the first embodiment of the temperature measuring device is applied.
Figure 11:
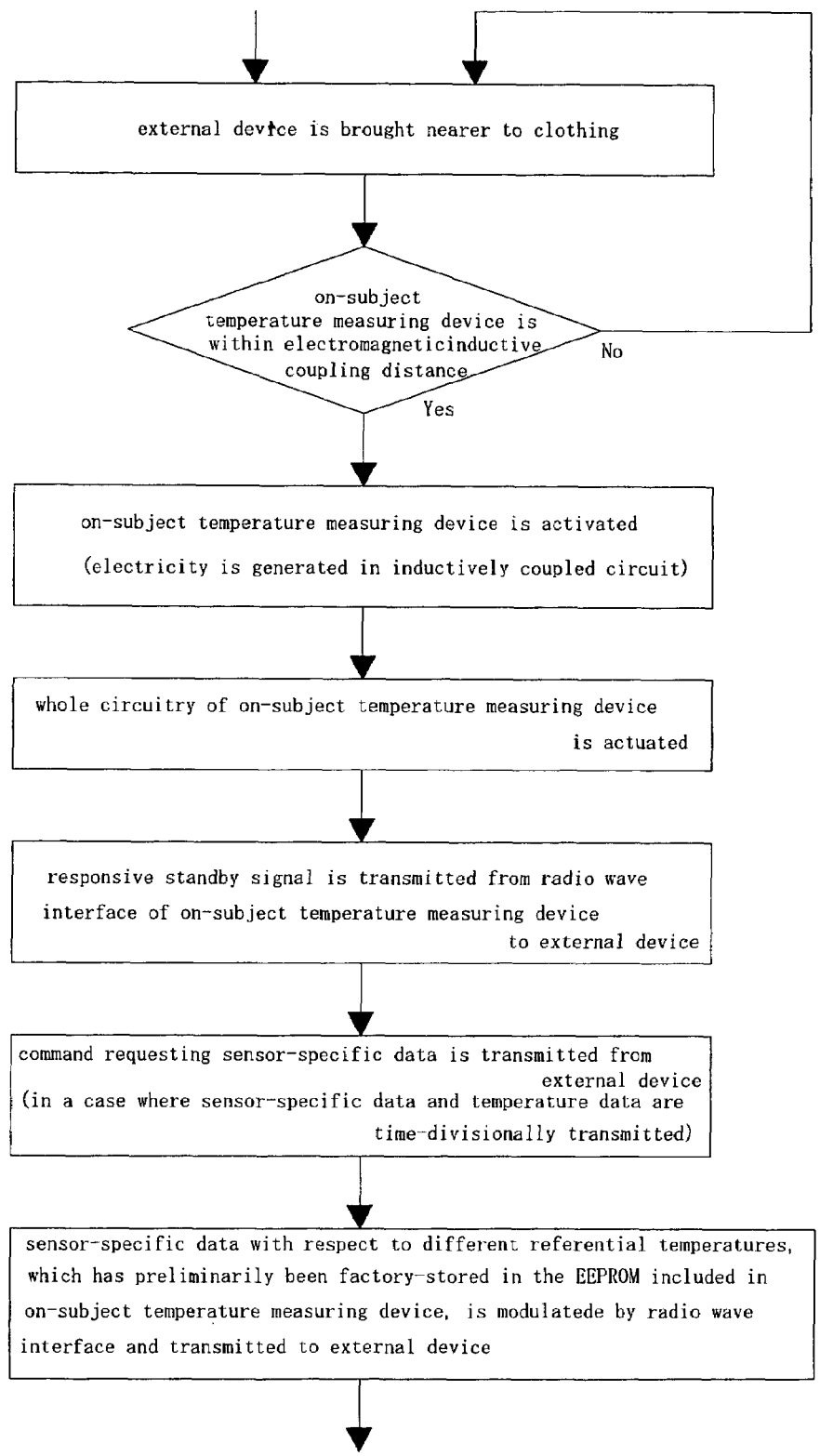
FIG. 11 is a flow chart of a temperature measuring process in the temperature measuring system to which the first embodiment of the temperature measuring device is applied.
Figure 12:
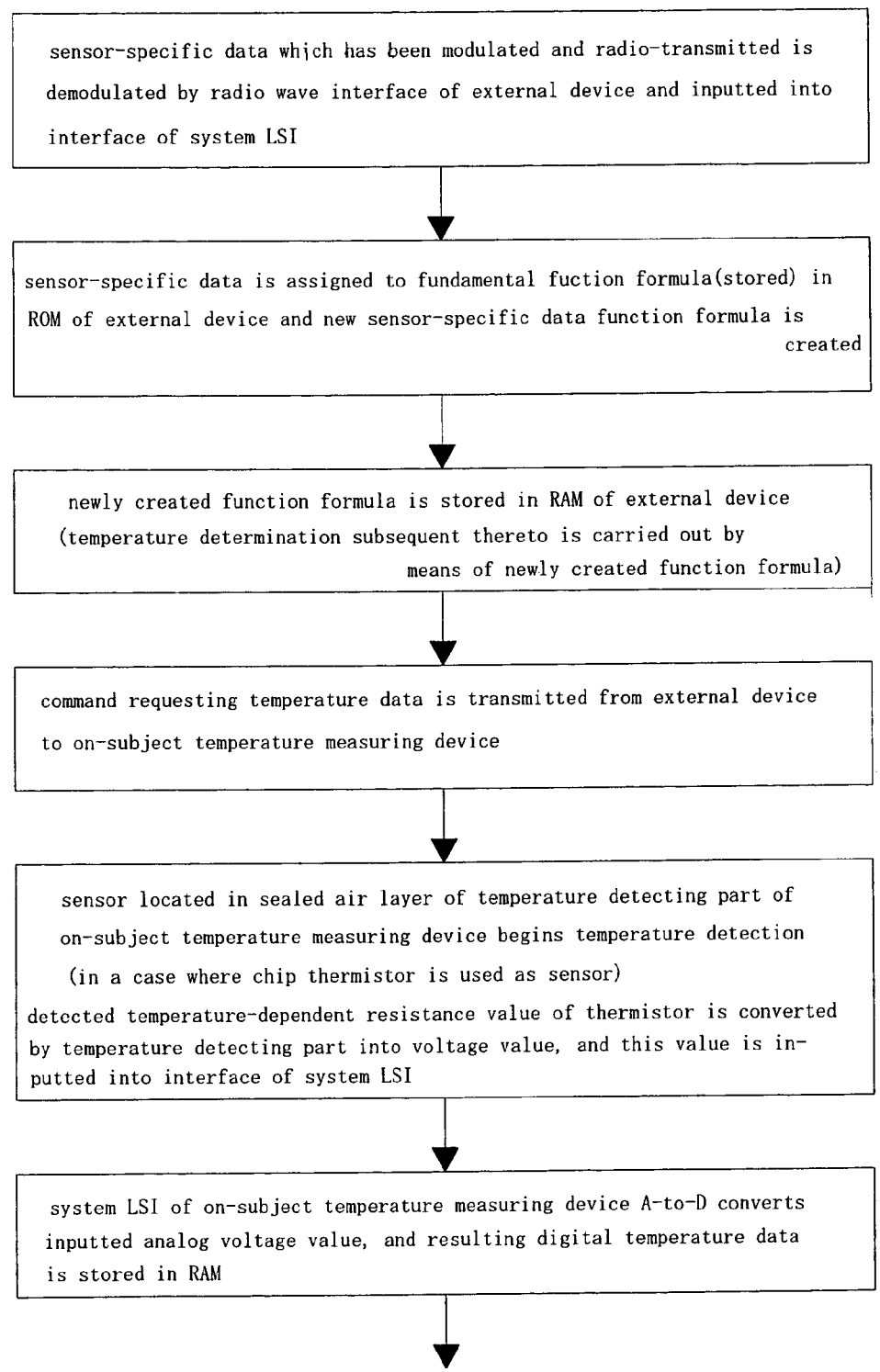
FIG. 12 is a flow chart of a temperature measuring process in the temperature measuring system to which the first embodiment of the temperature measuring device is applied.
Figure 13:
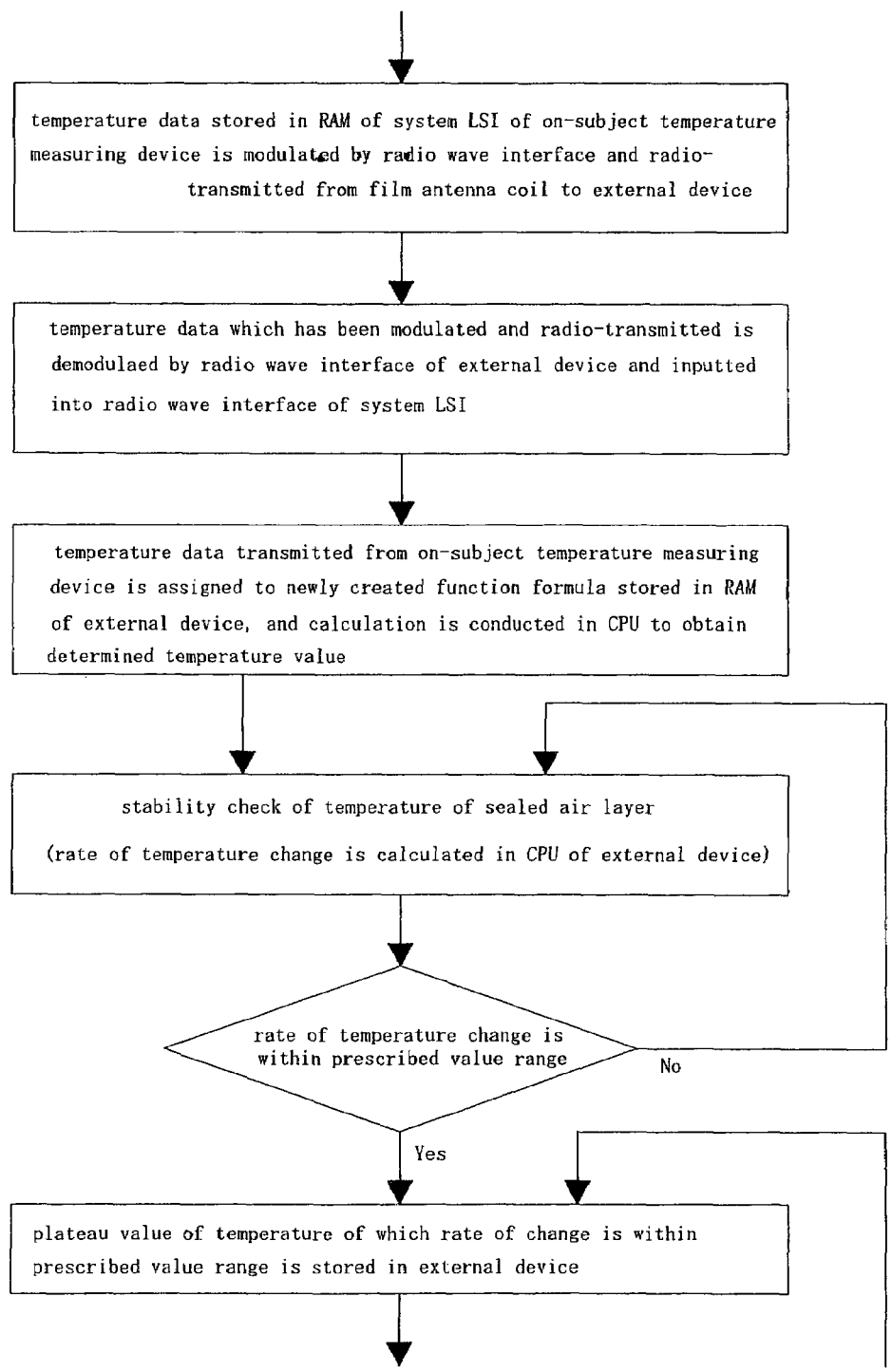
FIG. 13 is a flow chart of a temperature measuring process in the temperature measuring system to which the first embodiment of the temperature measuring device is applied.
Figure 14:
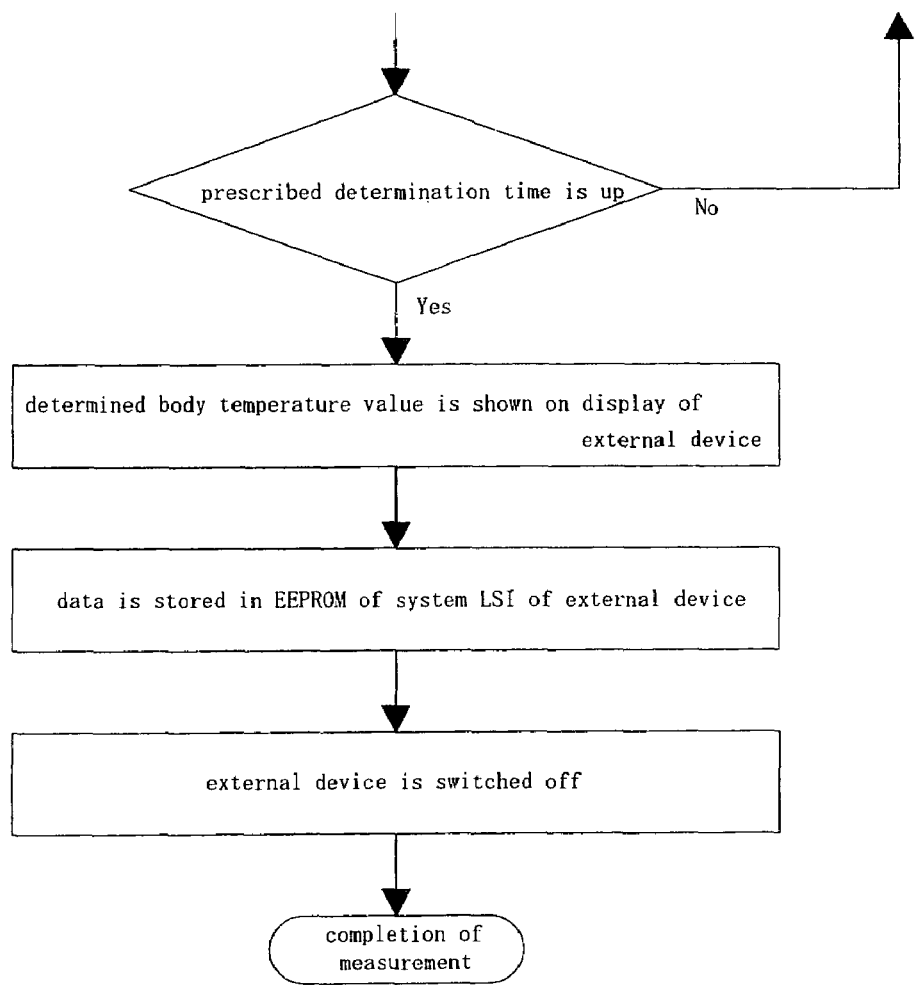
FIG. 14 is a flow chart of a temperature measuring process in the temperature measuring system to which the first embodiment of the temperature measuring device is applied.

Subsequently, as shown in FIG. 7, the film-form flexible control substrate 18 is attached to a nonwoven fabric 19 having a predetermined thickness in such a manner that the chip thermistor 22 or thermistor pattern 22a is placed in a space which is defined by an opening 20 of the nonwoven fabric 19 and which has a depth substantially corresponding to the predetermined thickness of the nonwoven fabric 19. The chip thermistor 22 is thereby exposed to the space defined by the opening 20 of the nonwoven fabric 19 as shown in FIG. 8, or the thermistor pattern 22a is likewise exposed to the space defined by the opening 20 of the nonwoven fabric 19 as shown in FIG. 9.

In the following, a temperature measuring process by means of the temperature measuring system to which the first embodiment of the temperature measuring device applied will be described with reference to flowcharts shown in FIGS. 10 to 14.

At the beginning of measurement, the on-subject temperature measuring device 1 is first applied to a surface of a subject body. Then, a temperature of the surface of the subject body is changed under influence of ambient air due to taking off clothing. However, by putting the clothing over the on-subject temperature measuring device 1, return of the temperature of the subject body surface which has been changed under influence of the ambient air begins. When a prescribed period of time for the return of the temperature of the subject body elapses, the temperature of the surface of the subject body in the clothing becomes stable to reach completion of the return of the temperature of the subject body. Consequently, a temperature of the sealed air layer 17 of the on-subject temperature measuring device 1 becomes stable. Then, the reader 2 as an external device is switched on, and an electromagnetic wave is thereby emitted from the reader 2. The reader 2 in this condition is brought nearer to the clothing. When the reader is brought within an electromagnetic inductive coupling distance which permits the inductively coupled circuit 15 of the on-subject temperature measuring device 1 to function, electric power is generated in the inductively coupled circuit 15 to actuate the on-subject temperature measuring device 1. In consequence, a standby signal as a response is transmitted from the radio wave interface 13 of the on-subject temperature measuring device 1 to the reader 2 as an external device. In response thereto, a command signal requesting the sensor-specific data (thermistor-specific characteristics ID) is transmitted from the reader 2 to the on-subject temperature sensing device 1 (in a case where the sensor-specific data and the temperature data are time-divisionally transmitted). By request, the on-subject temperature measuring device 1 transmits the sensor-specific data with respect to the different referential temperatures, which has preliminarily been factory-stored in the EEPROM 12f included in the on-subject temperature measuring device 1, to the reader 2 as an external device via the radio wave interface 13. The sensor-specific data (thermistor-specific characteristics ID) which has been modulated and radio-transmitted to the reader 2 as an external device is demodulated by the radio wave interface 7 in the reader 2 and inputted in the interface 5a of the system LSI 5. The sensor-specific data is assigned to the fundamental function formula stored in the ROM 5d of the reader 2 as an external device, and a new sensor-specific function formula is created by the CPU 5e of the reader 2 as an external device.

The newly created function formula is stored in the RAM 5c of the reader 2 as an external device. Temperature determinations subsequent thereto are carried out by means of the newly created function formula.

Then, a command requesting temperature data is transmitting from the reader 2 as an external device to the on-subject temperature measuring device 1, and the chip thermistor 22, which is so disposed as to be exposed to the sealed air layer 17 and to thereby constitute the temperature sensing part 14 of the on-subject temperature measuring device 1, initiates temperature detection. A resistance value of the chip thermistor which is derived from the measured temperature of the subject is converted into a voltage value in the temperature sensing part 14, and the voltage value is inputted into the interface 12a of the system LSI 12. The system LSI 12 of the on-subject temperature measuring device 1 subjects the inputted analog voltage value to A-to-D conversion, and the resulting digital temperature data is stored in the RAM 12c. Then, the temperature data stored in the RAM 12c of the system LSI 12 of the on-subject temperature measuring device 1 is modulated into a radio signal via the radio wave interface 13, the radio signal is transmitted from the film antenna coil 4 to the reader 2 as an external device.

In the reader 2 as an external device, the temperature data which has been modulated and radio-transmitted thereto is demodulated by the radio wave interface 7 and inputted in the interface 5a of the system LSI 5.

The temperature data transmitted from the on-subject temperature measuring device 1 is assigned to the newly created function formula stored in the RAM 5c of the reader 2 as an external device, and an operation is performed in CPU 5e to obtain a value of the measured temperature.

In each temperature determination as described above, temperature stability of the sealed air layer 17 is checked. Specifically, a rate of temperature change is calculated in the CPU 5e of the reader 2 as an external device. If the result of the calculation is not a rate of temperature change within a prescribed value range, temperature stability of the sealed air layer 17 is checked repeatedly until a rate of temperature change as a result of calculation in the CPU 5e becomes one within the prescribed value range. If a rate of temperature change as a result of calculation in CPU 5e is one within the prescribed value range, a peak value of the temperature which has changed within the prescribed value range is stored in the RAM 5c of the reader 2 as an external device. Then, such temperature determination procedure is performed repeatedly until a prescribed determination time elapses. On lapse of the prescribed temperature determination time, a measured temperature value of the subject is shown on the liquid crystal display 10 of the reader 2 as an external device. The data is stored in the EEPROM 5f of the system LSI 5 of the reader 2 as an external device, and the reader 2 as an external device is switched off to thereby terminate the temperature determination.

In the embodiment described above with reference to the flow charts, the chip thermistor 22 is used as a sensor of the temperature sensing part 14, and the sealed air layer 17 is described as a single sealed air layer. However, the present invention is not restricted to such a form. If a plurality of sealed air layers 17 are provided, sensor-specific information data of each of sensors placed in the respective sealed air layers 17 is transmitted to the reader 2 as an external device. The reader 2 as an external device creates, using the fundamental function formula stored in the ROM 5d, new function formulas of the same number as the sensors. In such a case where a plurality of new function formulas are created, an ID is allotted to each of the sensors and the ID is paired with the corresponding new function formula. In the above description, the new function formulas are created in the reader 2. However, new function formulas may be factory-created in calibration procedure and factory-stored in the EEPROM 12f in the on-subject temperature measuring device 1. In this case, in actual temperature determination, operation is conducted in CPU 12e of the on-subject temperature measuring device 1 to calculate a temperature of the subject, and the result is transmitted to the reader 2 and shown on the liquid crystal display 10 of the reader 2.

SECOND EMBODIMENT

In a temperature measuring system to which a second embodiment of the temperature measuring device according to the present invention is applied, a circuit element of an on-subject temperature measuring device 1 comprises no CPU or A/D converter, as different from the first embodiment. Instead thereof, an oscillation circuit is provided for producing oscillations with frequencies proportional to resistance values of a chip thermistor or film type thermistor, and a radio wave with such an oscillation frequency or a period (pulse width) of the frequency is directly transmitted as data to a reader 2 as an external device, and the frequency or period is converted into temperature data by a software in the external device. In this embodiment, the circuitry is simplified. This enables the temperature measuring system to be one to which such an inexpensive temperature measuring device is applied.

THIRD EMBODIMENT

Figure 15:
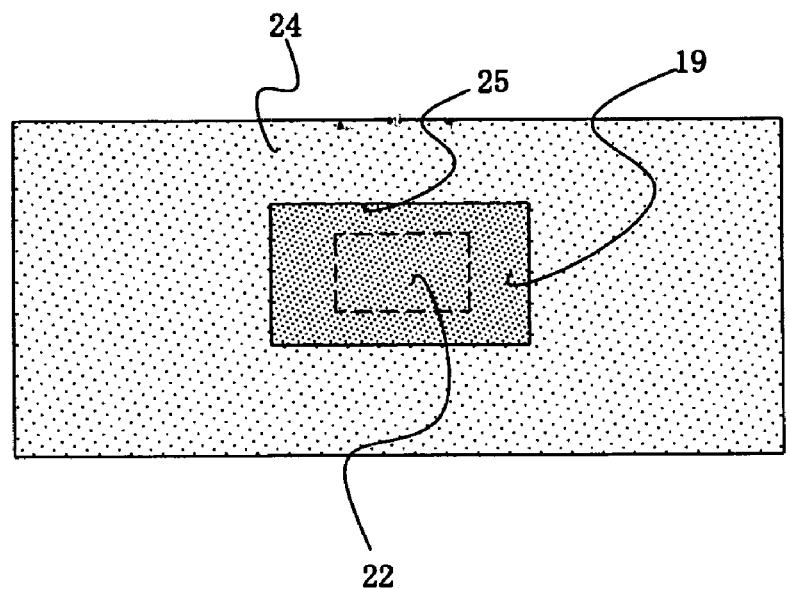
FIG. 15 is a bottom view of a third embodiment of the temperature measuring device.
Figure 16:
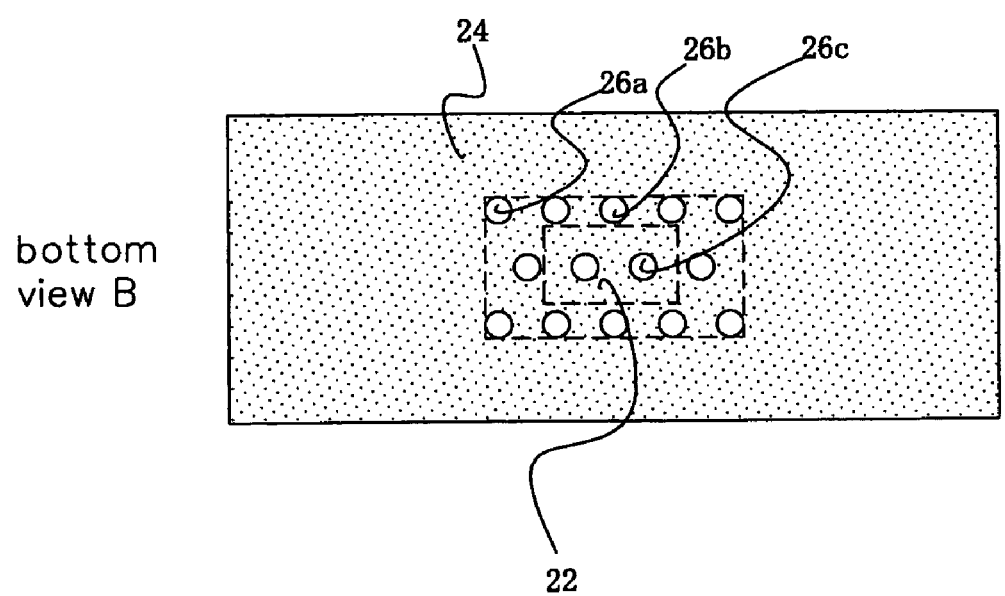
FIG. 16 is a bottom view of another form of the third embodiment of the temperature measuring device.
Figure 17:
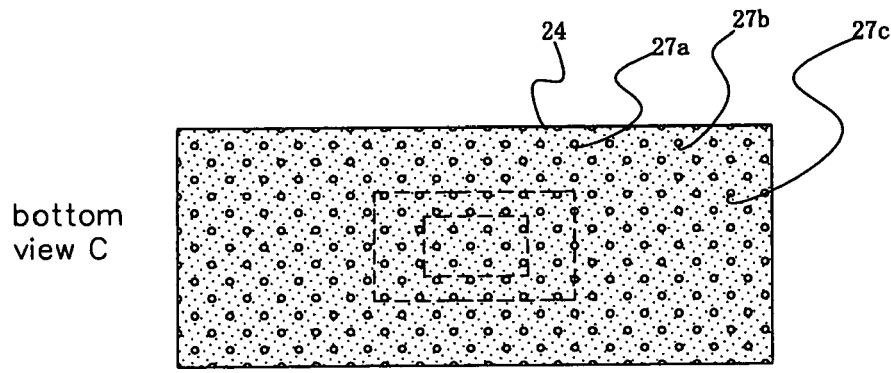
FIG. 17 is a bottom view of still another form of the third embodiment of the temperature measuring device.

FIG. 15 is a bottom view of a third embodiment of the on-subject temperature measuring device according to the present invention. FIG. 16 is a bottom view of another form of the third embodiment of the temperature measuring device according to the present invention. FIG. 17 is still another form of the third embodiment of the temperature measuring device according to the present invention. Difference between the third embodiment and the first embodiment resides in that a sheet 24 with an adhesive is used in the third embodiment of the temperature measuring device, and the sheet 24 with an adhesive is applied to a nonwoven fabric 19 which is attached to a film-form control substrate 18, and a space within an opening 20 of the nonwoven fabric 19 is thereby sealed as shown in the FIGS. In the form shown in FIG. 15, a rectangular air communication hole 25 is provided at a predetermined position of the sheet 24 with an adhesive. The air communication hole 25 may be circular.

In the form shown in FIG. 16, a plurality of air communication apertures 26a, 26b, 26c, 26d, 26e are provided in an area, which substantially corresponds to the opening 20 to which the film-form control substrate 18 is applied, of the sheet 24 with an adhesive. In the form shown in FIG. 17, punched perforations 27a, 27b, 27c, 27d, 27e are formed all over the sheet 24 with an adhesive.

FOURTH EMBODIMENT

Figure 18:
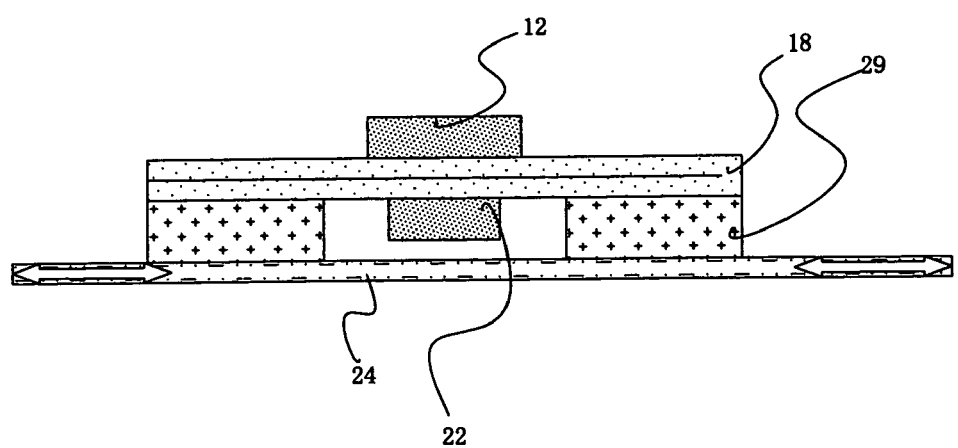
FIG. 18 is a sectional side view of the on-subject temperature measuring device of the temperature measuring system according to the present invention.

FIG. 18 is a sectional side view of a fourth embodiment of the on-subject temperature measuring device 1 of the temperature measuring system according to the present invention, wherein a sheet of a porous polytetrafluoroethylene of which pores are in communication with each other (,i.e., open-pore polytetrafluoroethylene) is used as a sheet 24 with an adhesive. As in the case of each of the above-described embodiments, a system LSI chip 12 is mounted on an upper surface of a film-form control substrate 18. Differently from each of the above-described embodiments, however, the film-form control substrate 18 is attached to an upper surface of a urethane (foamed material) or cork (heat insulating material) sheet 29. To the reverse surface of the urethane (foamed material) or cork (heat insulating material) sheet 28, the adhesive-applied sheet 24 made of an open-pore polytetrafluoroethylene is applied. As shown in the FIG., a space defined by an opening 20 centrally formed in the urethane (foamed material) or cork (heat insulating material) sheet 28 provides an air layer 21 having a thickness approximately corresponding to a predetermined thickness of the urethane (foamed material) or cork (heat insulating material) sheet 29 between the adhesive-applied sheet 24 and the reverse surface of the film-form control substrate 18.

The above-mentioned open-pore polytetrafluoroethylene is characterized in that it is prepared by orientation so as to have an open-pore structure. As a starting material, a polytetrafluoroethylene (PTFE) is used. A fine powder of a PTFE is compacted and uniaxally or biaxially oriented at a high temperature at a high speed to prepare an open-pore polytetrafluoroethylene. When orientation in two directions (biaxial orientation) is conducted, the resultant has a biaxially oriented structure which has granular nodes and radially extending fibrils. Pores of the open-pore polytetrafluoroethylene are not individually present but in communication with each other in all directions to form an open-pore structure of which pores do not come to the end inside the structure. Accordingly, the open-pore polytetrafluoroethylene has a structure of open-pore profile. The open-pore polytetrafluoroethylene has no substantial hydrophilicity or water absorption properties but shows high water repellency because of its high contact angle with water. Further, the open-pore polytetrafluoroethylene allows no liquid having high surface tension such as water to penetrate but has moisture permeability which allows water vapor transmission, and yet, it has a low intermolecular cohesive force and thus has an extremely low frictional resistance. Moreover, since the open-pore polytetrafluoroethylene is prepared by highly orienting a polytertafluoroethylene with an ultrahigh molecular weight, it is extremely though as a porous structure and has excellent biocompatibility to cause no substantial foreign-body reaction and has no toxic danger, carcinogenic danger or the like. Furthermore, the open-pore polytetrafluoroethylene undergoes no particular degradation or deterioration in a living body in vivo and is well permeable to gases because its pores, which provide the porous structure, are in communication with each other. In this connection, the gas permeability may freely be controlled by controlling pore size or porosity. Further, although the open-pore polytetrafluoroetylene has properties of nonadhesiveness and easy-releasability, it may be mechanically attached to a subject by anchor effect obtained by pressure-injecting an adhesive into pores. In addition, the open-pore polytetrafluoroethylene has a dielectric constant which is lower than that of a solid polytetrafluoroethylene because of its porous structure and which is the lowest among those of all solids, and thus it has excellent signal transmitting properties and high frequency insulating properties. Still further, the open-pore polytetrafluoroethylene may be used up to 260°, and it maintains its flexibility even at a temperature as low as −200°.

Figure 19:
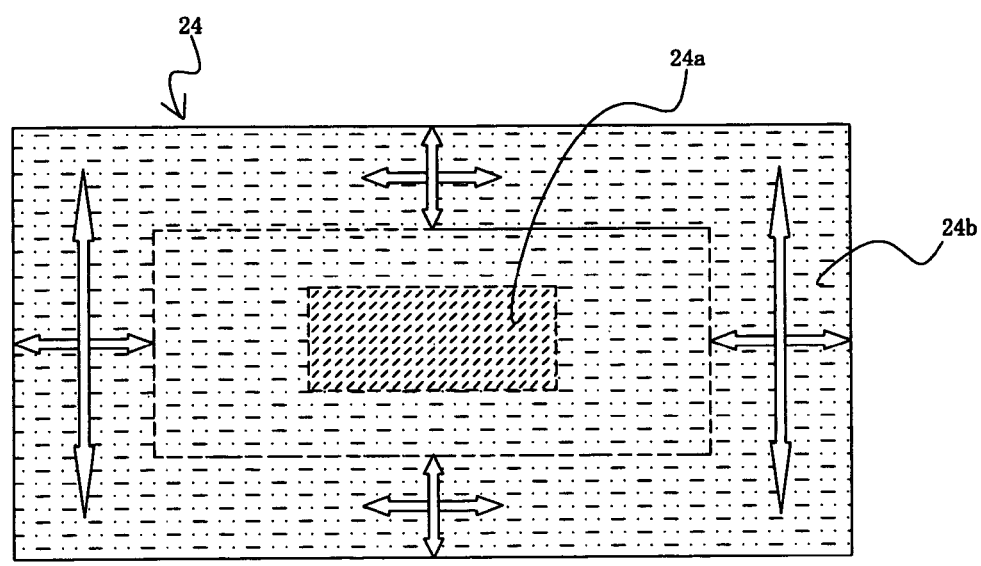
FIG. 19 is a sectional side view of the on-subject temperature measuring device of the temperature measuring system according to the present invention.

FIG. 19 is a bottom view of the fourth embodiment of the on-subject temperature measuring device 1 according to the present invention. In other words, FIG. 19 is a plan view of a surface, which is to be applied to a subject, of the fourth embodiment. As shown in the FIG., the adhesive-applied sheet 24 obtained by employing the open-pore polytetrafluoroethylene has a site corresponding to the air layer 21, i.e., a gas permeation site 24a and an area other the site, i.e., a biaxially oriented two-direction stretchable area 24b. The biaxially oriented two-direction stretchable area 24b has stretchability in the directions shown by arrows in the FIG.

FIFTH EMBODIMENT

Figure 20:
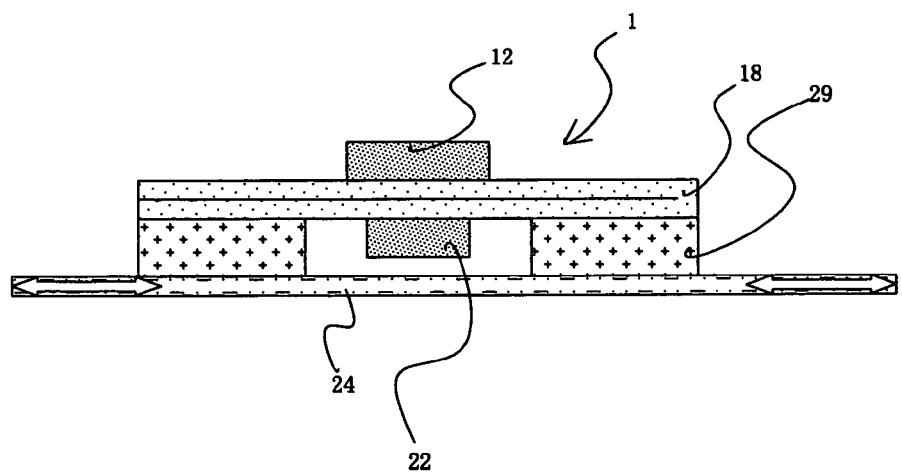
FIG. 20 is a sectional side view of the on-subject temperature measuring device of the temperature measuring system according to the present invention.
Figure 21:
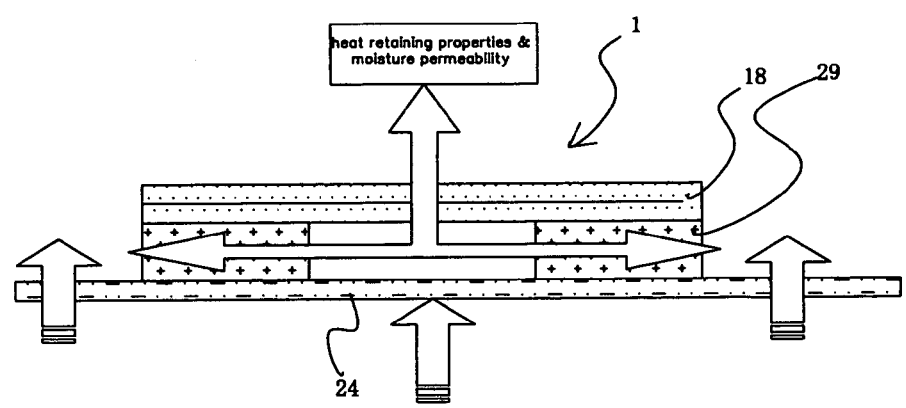
FIG. 21 is a sectional side view of the on-subject temperature measuring device of the temperature measuring system according to the present invention.
Figure 22:
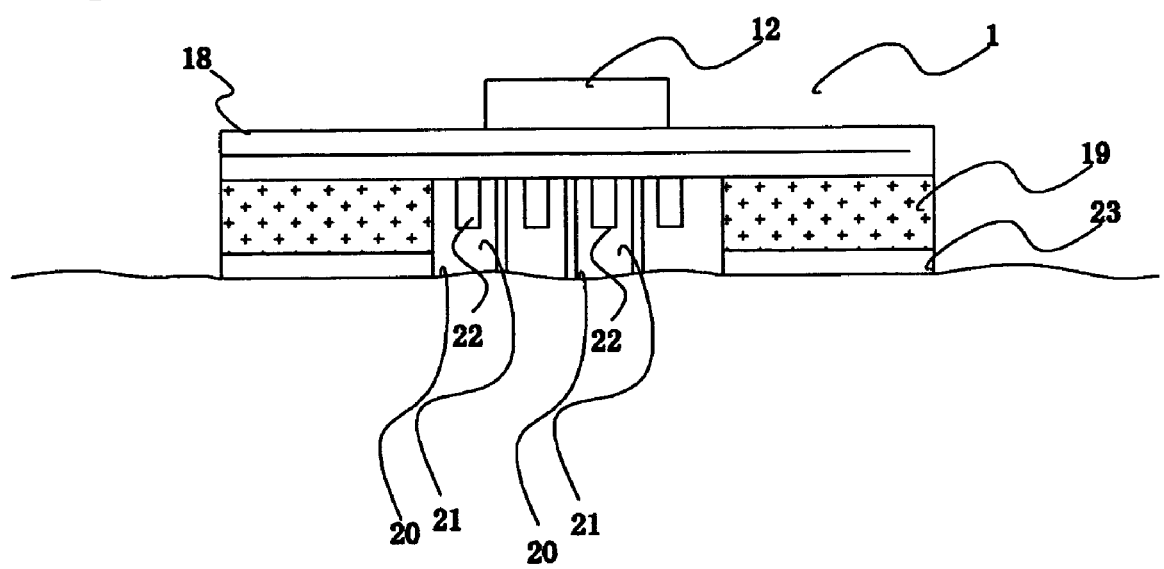
FIG. 22 is a sectional side view of the on-subject temperature measuring device of the temperature measuring system according to the present invention, including a plurality of openings 20.

Each of FIGS. 20 and 21 is a sectional side view of a fifth embodiment of the on-subject temperature measuring device 1 of the temperature measuring system according to the present invention, which embodiment is constructed such that a open-pore polytetrafluoroethylene is used for a film-form control substrate 18 and a flexible sheet 29 to which the film-form control substrate 18 is attached as well as an adhesive-applied sheet 24 and that as in the case of each of the above-described embodiments, a system LSI chip 12 is mounted on an upper surface of the film-form control substrate 18.

In the fifth embodiment of the on-subject temperature measuring device 1, since an open-pore polytetrafluoroethylene is used for the film-form control substrate 18 and the flexible sheet 29 to which the film-form control substrate 18 is attached as well as the adhesive-applied sheet 24, heat retaining properties and moisture permeability in the directions shown by arrows in FIG. 21 are ensured. Accordingly, when the on-subject temperature measuring device 1 is attached to a subject, it causes no particular discomfort and thus enables comfortable use.

INDUSTRIAL APPLICABILITY

The present invention relates to a temperature measuring device which, in temperature measurement, is driven without a battery and wirelessly transmits temperature data. Particularly, by virtue of the preliminary attachment of the temperature measuring device to a surface of a subject, a temperature of the subject can be measured instantaneously and precisely by means of an external device through radio waves when temperature measurement is needed. Accordingly, even if the subject is moving, temperature measurement can be carried out in real time successively.

In particular, in a case where a subject is a human body, the temperature measuring device has preliminarily been attached to a surface of the human body, thereby allowing a surface temperature of the human body to have become stable and enabling the surface temperature to be measured instantaneously and precisely from the outside of clothing when temperature measurement is needed. By virtue of this, even if the human body as a subject is moving or the person as a subject is sleeping, temperature measurement can be carried out in real time successively without restraint. Accordingly, the present invention is suitable for measuring temperatures of infants who moves restlessly or old persons whose axillary pits have enlarged. Further, if a subject is sleeping, a body temperature of the subject can be measured as occasion arises without being noticed by the subject.

The subject whose temperature is measured by the present invention is not restricted to a human body but includes a temperature of a general room, goods which are being transported, a temperature of a wine cellar, a temperature of a liquid in a reservoir and the like. With respect to subjects at temperatures in a range between about −50° to about 250° in which a temperature measuring element can operate, the temperatures of the subjects can be measured directly. With respect to subjects at temperatures without the range of about −50° to about 250°, the temperatures of the subjects can generally be measured if the temperatures of the subjects are subjected to attenuation or compression to indirectly measure the temperatures.

The invention claimed is:

1. A temperature measuring device comprising:
   a flexible sheet having its one surface endowed with stickiness for application to a surface of a subject, said flexible sheet being provided with an opening; and
   a temperature data detecting means for detecting a temperature of the inside of the opening,
   wherein a detecting part of the temperature data detecting means is so disposed as to be exposed to the inside of the opening with nothing but an air layer between the surface of the subject and an opposing surface of the detecting part.

2. The temperature measuring device according to claim 1, wherein the temperature data detecting means employs a means for converting a temperature value into a frequency, and wherein the temperature data detecting means is accommodated in a space defined by a predetermined thickness of the flexible sheet.

3. The temperature measuring device according to claim 1, wherein the temperature data detecting means employs a means for converting a temperature value into a period, and wherein the temperature data detecting means is accommodated in a space defined by a predetermined thickness of the flexible sheet.

4. The temperature measuring device according to claim 1, wherein the temperature data detecting means is provided with a built-in A/D converter for A-to-D converting a resistance value or voltage value in the form of an analog physical value, into which a temperature value has been converted, into a digital physical value.

5. The temperature measuring device according to claim 1, wherein one side of the space formed in the opening is defined by the temperature data detecting means, and the other side of the space is defined by a surface of a subject, and a sealed layer is thereby formed between the subject and the temperature data detecting means.

6. The temperature measuring device according to claim 1, wherein a plurality of the openings are provided.

7. The temperature measuring device according to claim 1, wherein temperature data detected by the temperature data detecting means is temperature data on a human body.

8. The temperature measuring device according to claim 1, wherein said detecting part is arranged in said opening so as to be set apart from a subject being measured via an air layer when the temperature measuring device is attached to the subject.

9. The temperature measuring device according to claim 1, wherein the detecting part comprises a chip thermistor which is directly exposed to the inside of the opening.

10. The temperature measuring device according to claim 1, which is capable of measuring the temperature of the subject under the condition where nothing but an air layer is present between the surface of the subject and an opposing surface of the detecting part.

11. The temperature measuring device according to claim 1, wherein a film-form control substrate with a system LSI chip mounted thereon is attached to an upper surface of the flexible sheet, and the temperature data detecting means is attached to an underside surface of the film-form control substrate in such a manner that the temperature data detecting means is exposed to an air layer in the opening formed in the flexible sheet.

12. The temperature measuring device according to claim 11, wherein the adhesive-applied sheet is attached to the flexible sheet to which the film-form control substrate is attached, and a space in the opening is thereby sealed, and wherein an open-pore polytetrafluoroethylene is used for the adhesive-applied sheet and/or the film-form control substrate and/or the flexible sheet to which the film-form control substrate is applied.

13. The temperature measuring device according to claim 11, wherein an adhesive-applied sheet is attached to the flexible sheet to which the film-form control substrate is attached, and a space in the opening is thereby sealed.

14. The temperature measuring device according to claim 13, wherein an air hole is formed at a predetermined position in the adhesive-applied sheet.

15. The temperature measuring device according to claim 13, wherein punched holes are formed in the adhesive-applied sheet.

16. The temperature measuring device according to claim 1, comprising an electromagnetic wave transmitting and receiving means which cooperates with the temperature data detecting means.

17. The temperature measuring device according to claim 16, wherein the electromagnetic wave transmitting and receiving means has an inductively coupled means for receiving electromagnetic waves from an external device.

18. The temperature measuring device according to claim 17, wherein the inductively coupled means receives an electromotive force from the external device through radio waves to supply electric power to the temperature data detecting means.

19. The temperature measuring device according to claim 18, wherein temperature data is radio-transmitted from the temperature data detecting means via an antenna coil of the inductively coupled means to the external device.

20. The temperature measuring device according to claim 19, wherein the temperature data and an ID code are combined into a unit and radio-transmitted from the temperature data detecting means via the antenna coil to the external device.

21. A temperature measuring method comprising:
providing a flexible sheet with an opening;
attaching the flexible sheet to a surface of a subject to thereby form an air layer sealed by the opening; and
measuring a temperature of the air layer by means of a temperature data detecting means,
wherein a detecting part of the temperature data detecting means is so disposed as to be exposed to the inside of the opening with nothing but an air layer between the surface of the subject and an opposing surface of the detecting part.

22. The temperature measuring method according to claim 21, wherein temperature data detected by the temperature data detecting means is stored in a memory provided on the flexible sheet, and the temperature data stored in the memory is read out after removal of the flexible sheet from the subject.

23. The temperature measuring method according to claim 21, wherein the subject is a human body.

24. The temperature measuring method according to claim 21, wherein the detecting part comprises a chip thermistor which is directly exposed to the inside of the opening.

25. The temperature measuring method according to claim 21, which is capable of measuring the temperature of the subject under the condition where nothing but an air layer is present between the surface of the subject and an opposing surface of the detecting part.

* * * * *